United States Patent
Kant

(10) Patent No.: US 10,225,232 B2
(45) Date of Patent: *Mar. 5, 2019

(54) METHOD AND SYSTEM FOR IDLE MODE TRANSFER FOR LOAD BALANCING ACROSS DISTRIBUTED DATA PLANE PROCESSING ENTITIES FOR MOBILE CORE NETWORK

(71) Applicant: MAVENIR SYSTEMS, INC., Richardson, TX (US)

(72) Inventor: Nishi Kant, Fremont, CA (US)

(73) Assignee: Mavenir Systems, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,516

(22) Filed: Jun. 20, 2017

(65) Prior Publication Data

US 2017/0353427 A1 Dec. 7, 2017

Related U.S. Application Data

(63) Continuation of application No. 14/801,629, filed on Jul. 16, 2015, now Pat. No. 9,712,488.

(60) Provisional application No. 62/025,806, filed on Jul. 17, 2014.

(51) Int. Cl.
 *H04L 29/12* (2006.01)
 *H04L 12/931* (2013.01)
(52) U.S. Cl.
 CPC .......... *H04L 61/2007* (2013.01); *H04L 49/00* (2013.01); *H04L 61/35* (2013.01)

(58) Field of Classification Search
 CPC ..... H04W 28/08; H04W 88/12–88/188; H04L 49/20; H04L 49/205; H04L 49/206; H04L 61/2007; H04L 61/35
 See application file for complete search history.

(56) References Cited

U.S. PATENT DOCUMENTS

| | | |
|---|---|---|
| 2003/0067874 A1 | 4/2003 | See |
| 2014/0269288 A1 | 9/2014 | Crisan |
| 2015/0009830 A1 | 1/2015 | Bisht |
| 2015/0124622 A1 | 5/2015 | Kovvali |
| 2015/0149643 A1 | 5/2015 | Hu |
| 2015/0358236 A1 | 12/2015 | Roach |
| 2016/0269295 A1 | 9/2016 | A S et al. |
| 2017/0026462 A1 | 1/2017 | Yin |

*Primary Examiner* — Paul H Masur
(74) *Attorney, Agent, or Firm* — Ohlandt, Greeley, Ruggiero & Perle, L.L.P.

(57) ABSTRACT

A system and an algorithm in a mobile core network to distribute the data load across multiple data processing entities. The system is seen as having one data plane entity to the external entities like routers; hence the system can scale without needing to update the external nodes. In general when a data plane processing entity is added or removed, a new distribution rule is provided to the remaining data plane processing entities. Only after some number of sessions have been migrated does the new distribution get provided to the data distribution entities. This delay allows sufficient sessions to be migrated to minimize the overall number of packets that have to be forwarded for processing. This benefit can be maximized by taking advantage of cellular network's idle mode behavior and by migrating the sessions while they are in idle mode.

10 Claims, 5 Drawing Sheets

METHOD AND SYSTEM FOR IDLE MODE TRANSFER FOR LOAD BALANCING ACROSS DISTRIBUTED DATA PLANE PROCESSING ENTITIES FOR MOBILE CORE NETWORK

CROSS REFERENCE TO RELATED APPLICATIONS

This application is a continuation of U.S. application Ser. No. 14/801,629, filed Jul. 16, 2015, now issued as U.S. Pat. No. 9,712,488, which claims priority under 35 U.S.C. § 119(e) to U.S. Provisional Application No. 62/025,806, filed Jul. 17, 2014 entitled "Method and System for Optimized Load Balancing Across Distributed Data Plane Processing Entities for Mobile Core Network," the entire contents of which are incorporated herein by reference.

FIELD OF THE INVENTION

The present invention relates generally to mobile packet core networks. More particularly, this invention relates to a method for distributing the load across multiple data plane processing entities that are seen as one data plane entity from external routers, while providing for the elastic increase and decrease of the number of total data plan entities depending on the load without losing the data session continuity and minimizing the inter-entity forwarding to reduce the latency.

SUMMARY OF THE DESCRIPTION

An intelligent and optimized system and an algorithm used in a mobile core network to distribute the data load across multiple data processing entities are defined. The system is seen as having one data plane entity to the external entities like routers so that the routers do not need to know the internal deployment of the data plane entities, especially how many data plane entities are deployed; hence the system can scale without needing to update the external nodes. The system consists of data processing entity, inter-entity data forwarding logic, load distribution decision logic, and data distribution entity.

Load distribution decision logic selects which data plane entity is handling each flow, making sure that the load is distributed across multiple data processing entities as equally as possible, considering several factors such as the number of data processing entities, the percentage of inter-data processing entity forwarding, and the current load of each data processing entity. When a new data processing entity is introduced, the load distribution decision logic calculates a new algorithm to distribute the load. It also orders the data processing entities to start migrating the sessions they have to the new data processing entity according to the new logic.

A data distribution entity receives data from external nodes, e.g., routers or the wireless network, and distributes the data to the data processing entities according to the algorithm provided by load distribution decision logic. The data distribution entity uses the same algorithm until the load distribution decision logic provides it with a new algorithm. When the new algorithm is triggered, the data distribution entity uses the new algorithm to distribute the data to the data processing entities.

A data processing entity processes the data packets and maintains the flow information. A new flow is assigned to a data processing entity according to the load distribution logic and the data processing entity maintains the flow information to process that flow onwards. When a new data processing entity is introduced into the system or an existing data processing entity needs to be removed from the system, the data needs to be redistributed evenly across the new number of data processing entities and the load distribution decision logic calculates the new algorithm. When triggered by the load distribution decision logic, each data processing entity is updated with the new algorithm, calculates the new data processing entity for the flow, and starts forwarding the flow information for each flow to the newly assigned data processing entity.

The data processing entity can take advantage of the idle mode characteristics of the cellular network and forwards the flow information of each flow when the session goes into idle mode or while in idle mode, hence no active data communications are happening. This reduces the chance of packets being dropped due to flow information not updated fast enough while packets are being sent.

When a new data processing entity is first introduced and a new algorithm to distribute the load evenly is triggered, most of the flow is at the old data processing entity according to the old algorithm. The data distribution entity still has the old algorithm and sends the data to data processing entity according to the old algorithm. The inter-data processing entity forwarding is minimum in the beginning but as the migration continues, this forwarding rate will increase since the data distribution entity still uses the old algorithm. Load distribution decision logic monitors this forwarding rate from each data plane entity and decides the optimal point to start using the new algorithm at the data distribution entity, such as when the forwarding rate by the data processing entities is less than 50%, i.e. the data processing entities are processing more of their data then they are forwarding. Once the new algorithm is enabled at the data distribution entity the forwarding happens at the data processing entities from the new entity to the old entity. As the migration continues, the forwarding rate will decrease and eventually all the data will be distributed to the right data processing entity.

With this mechanism, the system can handle any type of load without exposing its internal deployment and without losing data connectivity while minimizing additional hop of forwarding. Another advantage of this mechanism is that the route table management becomes very simple by using static distribution algorithm and decreases the data latency caused by large route table lookup.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, a mechanism is provided to distribute data packets evenly across multiple data processing entities while providing elastic scalability to increase and decrease the number of data processing entities according to the load without needing to advertise these changes to the external entities as well as minimizing the forwarding needs among data processing entities to reduce the data plane latency. In one embodiment, a virtual optimized core (VOC) is configured to handle all the procedures to support mobility/session management, authentication/authorization, and data processing for the mobile devices as one logical core network node. The VOC includes the control plane and data plane processing functionalities to support the aforementioned procedures.

Figure 1:
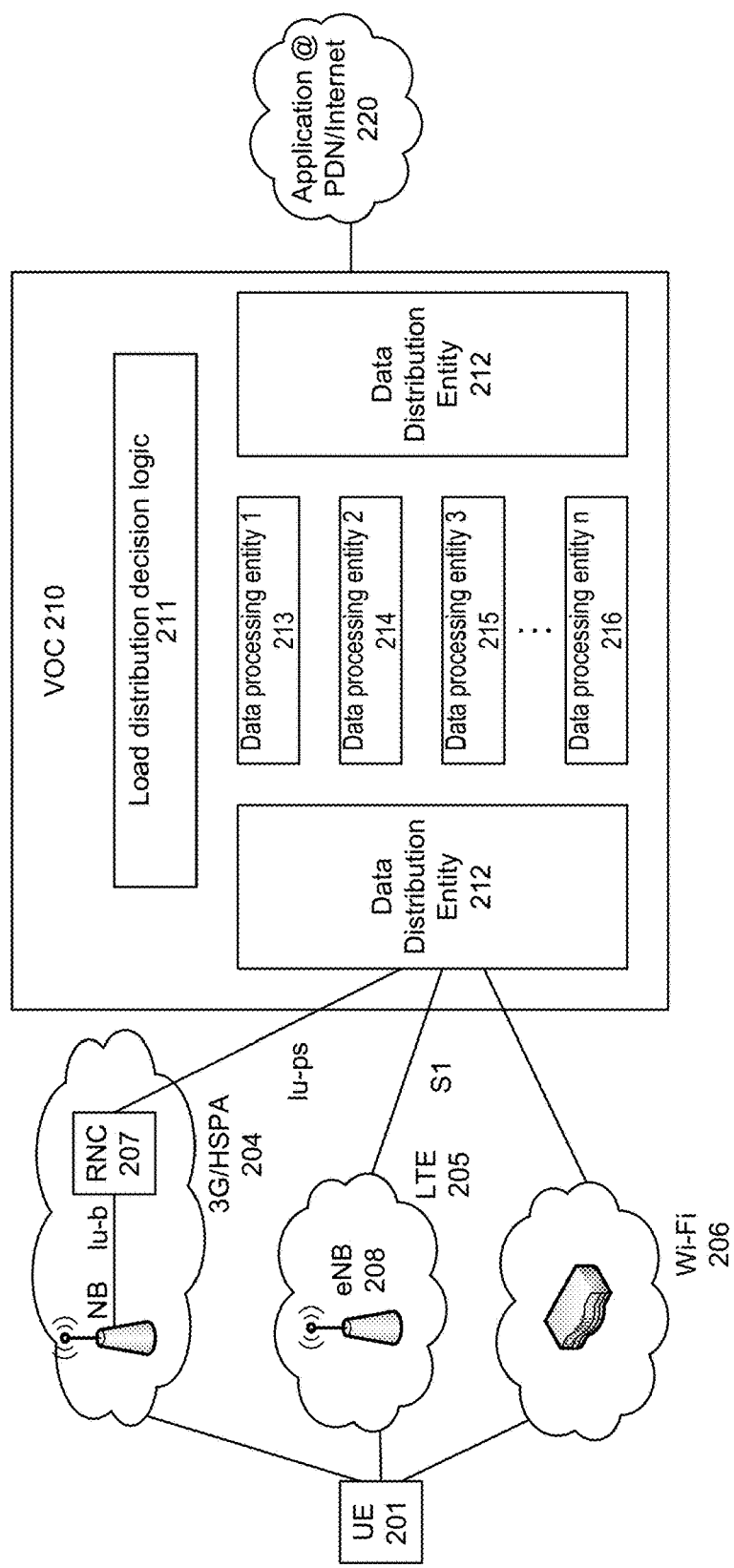
FIG. 1 is a block diagram illustrating the system according to one embodiment.

FIG. 1 is a block diagram illustrating a network configuration according to one embodiment of the invention. Referring to FIG. 1, user equipment (UE) 201, is communicatively coupled to a virtual optimized core (VOC) 210 having collapsed core network functionality with an optimized data load distribution algorithm according to the present invention, to communicate with application servers and applications located at a private packet data network (PDN) or the Internet 220. UE 201 can be coupled to the VOC 210 via a corresponding 3G radio access network (3G RAN) 204, long term evolution (LTE) access network 205 or Wi-Fi access network 206.

As VOC 210 is a self-contained core network realization containing all the core network functionalities including SGSN/S-GW/MME, GGSN/P-GW, HLR/HSS, and PeRF, it can communicate to a UE 201 via various access networks by simply supporting interfaces towards the access networks, without the need for a total core network upgrade or update. For example, when a mobile carrier upgrades the network from 3G to LTE, VOC 210 can support the upgrade by supporting Si interface from an eNB 208 in addition to supporting a Iu-ps interface from a radio network controller (RNC) 207, while all the rest of functionalities remain the same, thus removing the need for extensive upgrade for mobile carriers.

In one embodiment, the VOC 210 includes, among others, load distribution decision logic 211, data distribution entities 212, and a plurality of data processing entities 213, 214, 215, 216. The load distribution decision logic 211 is designed to decide to which DPE each session belongs to, based on the number of active data processing entities and the current load, and communicate the logic, algorithm or distribution formula to other entities in the VOC 210. The data distribution entity 212 is designed to distribute the incoming data packets to the right DPE according to the distribution logic set by load distribution decision logic 211. A data processing entity 213-216 is designed to manage a session table for the sessions it is assigned or associated with; process the packets that are sent by the data distribution entity 212 with the information in the session table; determine the data processing entity that has the session information in case it does not have the session information for the packets that are sent, according to the distribution rule set by load distribution decision logic; and forward the packets to the right data processing entity.

The load distribution decision logic 211 uses an algorithm to select the data processing entity for each session. Since the VOC 210 is seen as one logical core network node, the external entities like routers will only have one IP address towards the VOC 210 and do not know the internal configuration and deployment of the VOC 210. This ensures that service providers can use as many or as few data processing entities as needed without re-configuring or re-engineering the whole network and ensures flexible scalability of the system. However this causes one problem of identifying the data processing entity that has the session information for a given packet when the packets arrive at the system. The only available information for the packet is the IP header and the VOC 210 needs to look up the session table that has the mapping of the IP address and serving data processing entity ID. As the number of users grows, the size of the session table grows and the lookup in a large size table creates huge inefficiency and latency of the data processing, degrading data performance. This problem can be mitigated by using static distribution of the sessions to each data processing entity, e.g. assigning the sessions that ends with odd numbered IP address to the data processing entity 1 (DPE1), and even numbered IP addresses to the DPE2. With this mechanism, lookup is not needed and the data distribution is accelerated with minimum overhead. However, this has a limitation on scaling when one more DPE is needed or one less DPE is needed in the system. When a new DPE is introduced, a new rule needs to be applied to evenly distribute the load and a mechanism to handle both the sessions that are already assigned to the DPE according to the old rule and sessions that are being assigned according to a new rule. The load distribution decision logic 211 addresses these issues with an optimized algorithm so that it provides simple distribution rules to minimize the data processing latency while ensuring the scalability of the system.

This algorithm uses the number of active data processing entities and a simple hashing function (e.g. hashing of a session key like IP address) to assign the sessions to a corresponding DPE. The distribution algorithm is expressed in the format of F(N, Wn) where N is the number of active DPEs and Wn is projected weighted coefficient based on the statistical load. Once the rule is set, the load distribution decision logic 211 assigns each session to a corresponding DPE according to the rule, and shares the rule with the DPEs 213-216 and the data distribution entity 212.

The data distribution entity 212 is the first entity that receives data packets from an external entity such as the UE 201 or an application on the PDN or Internet 220. When it receives a data packet, it performs the calculation and determines a corresponding DPE that has the session information for this packet according to the rule set by the load distribution decision logic, then it sends the packet to that DPE. The data distribution entity 212 uses the same rule to forward the packets to DPEs 213-216 until it is informed of a new rule.

When the calculation mechanism is simple enough, such as simple hashing of IP address, the calculation overhead is small and acts as a static rule, removing the need for large size table lookup. When a new rule is informed by the load distribution decision logic 211, the data distribution entity 212 starts using that rule to calculate the corresponding DPE for the received packets.

The data processing entity (DPE) 213-216 is also informed with the distribution logic by the load distribution decision logic 211. When a session is assigned to a DPE, DPE 213-216 gets all the information for that session from the control plane entity (not shown) and creates a session table for this session. The DPE 213-216 is responsible for managing this table, processing the packets it receives if it has the session information for this packet, or forwarding the packets to the right DPE that has the session information for this packet if it does not have the information for this packet. Each DPE 213-216 knows which DPE 213-216 has the information for this session using the distribution logic set by load distribution decision logic 211. The DPE 213-216 reports the data forwarding rate to the load distribution decision logic 211 and the load distribution decision logic 211 collects the forwarding rate from all the DPEs 213-216 and decides the optimal point to start using the new rule at data distribution entity 212.

When a new DPE is first introduced to the system, the previous DPEs have the session information for the sessions according to the old rule. So it makes sense to use old rule at the data distribution entity 212. As the sessions are migrated according to new rules, the forwarding rate increases and the load distribution decision logic 211 makes a decision to start using the new rule. The preferred changeover point is when the forwarding rate is less than 50%, indicating that more sessions are in the correct locations than are in the wrong locations. The load distribution decision logic 211 informs the new rule to the data distribution entity 212 and the data distribution entity 212 starts forwarding the data according to the new rule. In this case, the new DPE needs to forward those sessions that are not migrated yet to the old DPEs. As the sessions are further migrated, the forwarding rate decreases and the eventually sessions are distributed evenly across all the DPEs including the newly introduced DPE.

Figure 2:
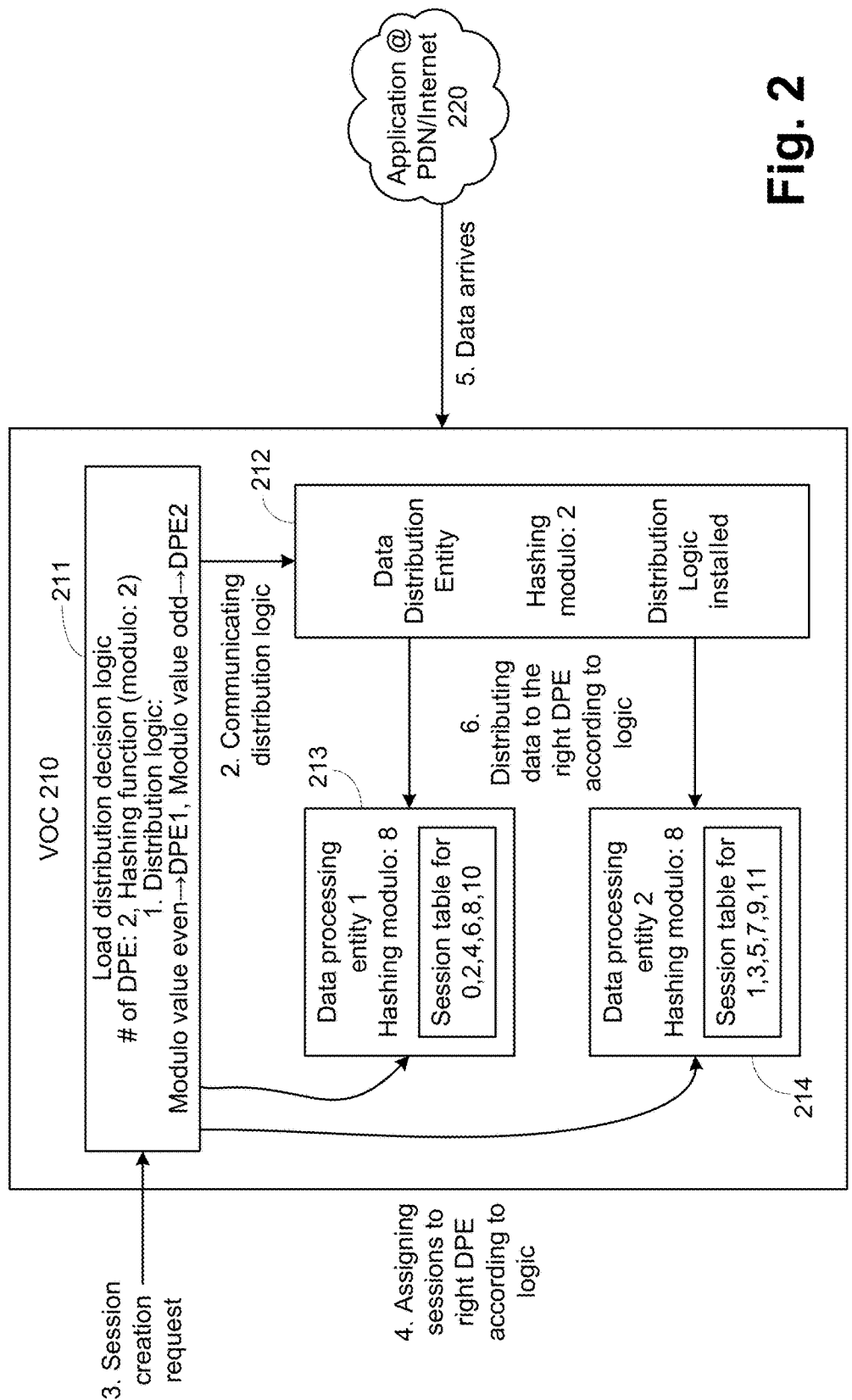
FIG. 2 is a diagram illustrating the initial handling of data packets with two data processing entities according to one embodiment of the invention.

FIG. 2 is a diagram illustrating the initial handling of data packets with two data processing entities according to one embodiment of the invention. In this example, for the hashing algorithm F(N, Wn), arithmetic modulo is used for F where N is the number of active DPEs and Wn is 1, i.e. all DPEs are assumed with same load.

In step 1, the load distribution decision logic 211 in the virtual optimized core (VOC) 210 uses the distribution logic modulo value of the IP address. The VOC 210 has two active data processing entities (DPE) 213, 214 and sets the modulo value as 2. With these, the load distribution decision logic 211 sets a simple distribution logic such as all the sessions with an even modulo value (e.g. 0, 2, 4, 6, etc.) will be assigned to the DPE1 213 and sessions with an odd modulo value (e.g. 1, 3, 5, 7, etc.) to the DPE2 214. In step 2, the load distribution decision logic 211 communicates this distribution logic and the modulo value to the data distribution entity 212. With this, the data distribution entities 212 install the hashing modulo value as 8 and the same distribution logic as set by the load distribution decision logic 211. In steps 3 and 4, when a request is received to create a session, the load distribution decision logic 211 calculates the corresponding DPE 213 or 214 according to the distribution logic and assigns the session to that DPE 213, 214. When a DPE is assigned with a session, the DPE 213, 214 creates the session table for this session and maintains the information to process the packets that belong to this session. In this example, sessions with the IDs of 0, 2, 4, 6, 8, 10 are assigned to DPE1 213 and sessions with IDs 1, 3, 5, 7, 9, 11 to DPE2 214 according to the rule.

In steps 5 and 6, when data arrives from the PDN or Internet, the data distribution entity 212 calculates the corresponding DPE according to the installed distribution logic and distributes the data to that DPE 213 or 214. Since all three entities, including load distribution decision logic 211, data processing entities 213, 214, and data distribution entity 212, have the same distribution logic, all the data is distributed to the correct DPE that has the information for that packet and the data is evenly distributed between the two DPEs 213, 214.

Figure 3:
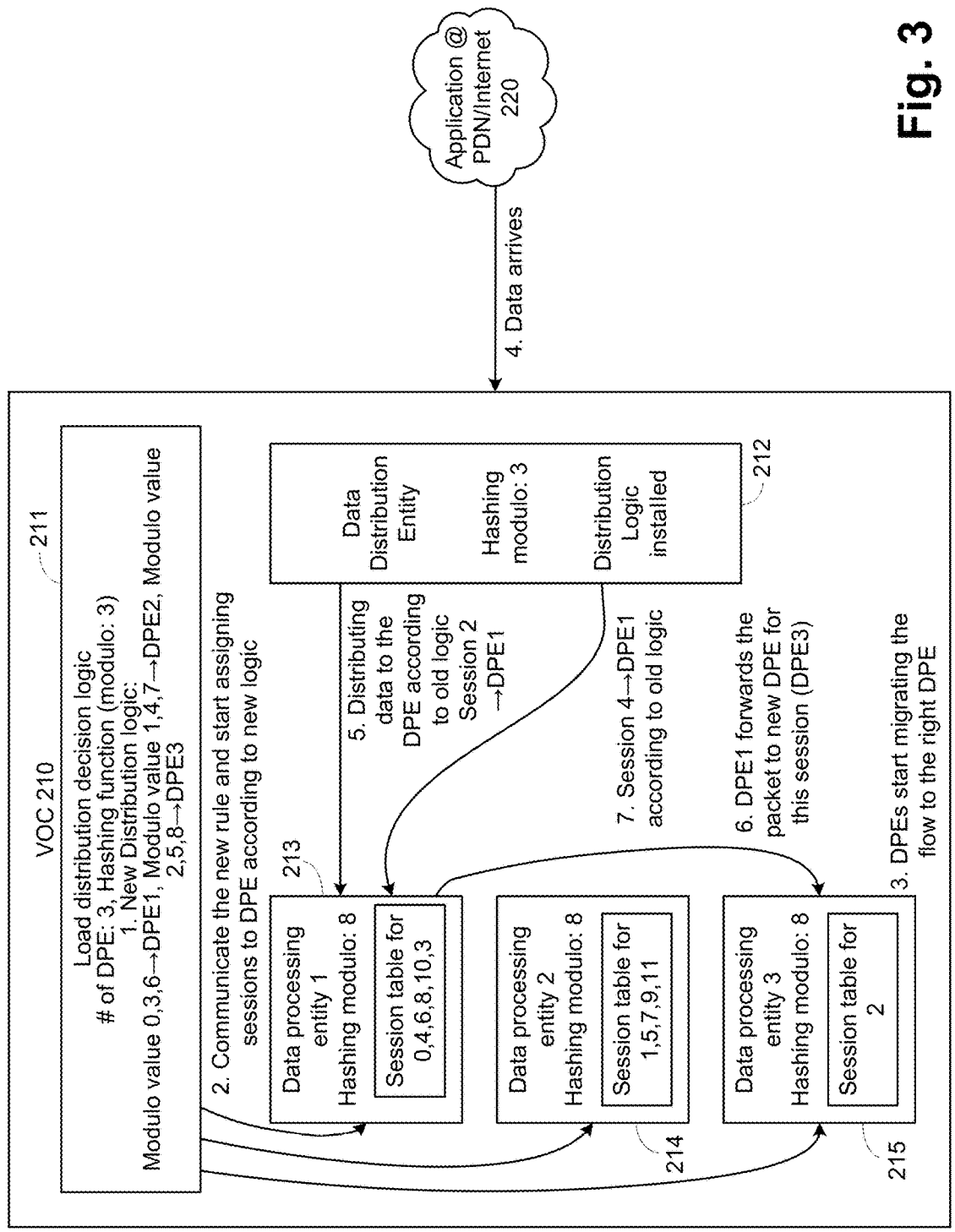
FIG. 3 is a diagram illustrating the system behavior when a new data processing entity is introduced to a system according to one embodiment of the invention.

FIG. 3 is a diagram illustrating the system behavior when a new data processing entity is introduced to a system. In this example, DPE3 215 is added to the system and VOC 210 has total 3 active DPEs. In step 1, with DPE3 215 added to the system, the load distribution decision logic 211 changes the distribution rule to accommodate the new DPE. The total number of active DPEs becomes 3 now and the modulo number is set as 3. With these new numbers, distribution rule is set such that sessions with modulo value 0, 3, 6, etc. are assigned to DPE1 213, sessions with modulo value 1, 4, 7, etc. to DPE2 214, and sessions with modulo value 2, 5, 8, etc. to DPE3 215.

In step 2, the load distribution decision logic 211 communicates the new distribution rule to the DPEs 213-215 and starts assigning the sessions to each DPE 213-215 according to the new rule. In step 3, when the new distribution rule is installed at DPE, each DPE starts migrating the sessions to the DPEs according to the new rule, so that each session information is stored in the corresponding DPEs according to the new distribution rule. This migration does not need to be performed in real time but can happen over time according to the load of the DPE 213-215. Especially, a DPE 213-215 can take advantage of the idle mode situation of the sessions. In cellular networks especially with the smart phones, the devices go into idle mode to save the battery life. The devices go into idle mode very frequently, e.g. after 10 seconds of inactivity of data, and when the devices are in idle mode, the data path is put on a hold and no data communications are happening until the connection is resumed through a service request procedure. If a DPE migrates the sessions to a new DPE according to the new rule only when the sessions are idle, there is less chance of clashing the migration and the sending the data from data distribution logic 212 and the migration process is more stable, though it may take longer to migrate the sessions since the DPE needs to wait for the sessions to go idle. In this FIG. 3, session information for sessions 2 and 3 is migrated according to new distribution rule (session 2 from DPE1 213 to DPE3 215, session 3 from DPE2 214 to DPE1 213). Again, this migration can happen when session 2 and session 3 are in idle mode, so the migration timing may be different between session 2 and session 3. For example, session 2 may go idle very quickly and be migrated to a new DPE while session 3 stays connected for a long time so migration for session 3 takes place much later.

In step 4, data packets for the users arrive at data distribution entity from the external PDN/Internet 220. The data distribution entity 212 still has the old distribution rule and distributes the packets to the corresponding DPE according to the old distribution rule. For example, in step 5, packets for session 2 are distributed to DPE1 213 according to the old rule. Then the DPE1 213 figures out that session 2 has migrated to DPE3 215 according to the new rule and forwards the packet to DPE3 215 in step 6. According to the new rule, session 4 should be handled by DPE2 214. However, the migration has not happened for this session yet; hence the data distribution entity distributes the packets for session 4 to DPE1 213 according to old rule in step 7, and the DPE1 213 will process the packets since it still has the session information for that session.

Figure 4:
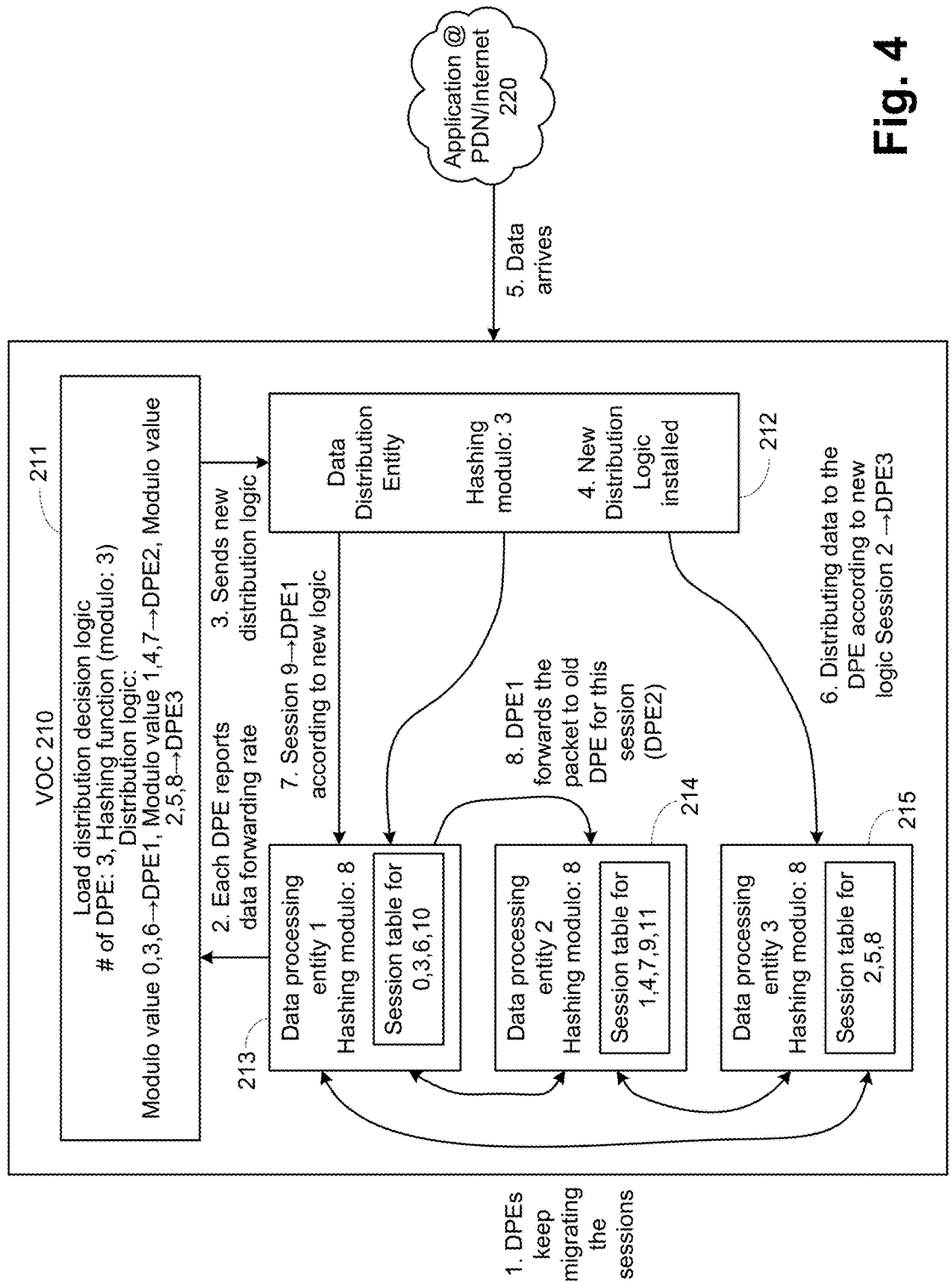
FIG. 4 is a diagram illustrating the system behavior when the data is distributed based on a new distribution rule according to one embodiment of the invention.

FIG. 4 is a diagram illustrating the system behavior when the migration at the DPEs continues and the rate that each packet is forwarded from old DPE to new DPE increases to reach the threshold value of a 50% transfer rate. At step 1, DPEs 213-215 keep migrating the sessions to the new DPEs according to the new distribution rule. A DPE 213-215 can do the migration real time or when the session goes idle. With the continued migration in this example, sessions 0 through 8 are migrated to the DPEs 213-215 according to new distribution rule, and sessions 9 through ii still are stored at the DPEs 213-215 according to the old distribution rule. At step 2, each DPE 213-215 reports the data forwarding rate to the load distribution decision logic 211 and the load distribution decision logic 211 decides the optimal time to use new distribution logic to distribute the packets, in the preferred embodiment the less than 50% forwarding rate threshold, though other optimal points may be developed depending on the desired load balance and the like. When the load distribution decision logic 211 decides the forwarding rate will decrease with new distribution logic, it sends the new distribution rule to the data distribution entity 212 at step 3 and the data distribution entity 212 installs the new distribution logic at step 4.

At step 5, data packets arrive at data distribution entity 212. The data distribution entity 212 uses the new distribution rule to distribute the packets to the corresponding DPEs 213-215. For example in this figure, at step 6, packets for session 2 are now distributed to DPE3 215 according to the new distribution rule, compared to DPE1 213 with old distribution rule. Since session 2 is already migrated to DPE3 215 from DPE1 213, DPE3 215 has the information for this session and handles the packets for session 2 without further forwarding.

At step 7, packets for session 9 are distributed to DPE1 213 according to the new distribution rule. However, session 9 has not migrated yet to the new DPE and the information for this session is still stored in DPE2 214. When DPE1 213 receives the packets for session 9, it forwards the packets to the DPE2 214 according to the old distribution rule at step 8, having maintained the old distribution rule for this purpose, and DPE2 214 processes the packets. When all sessions are migrated, each DPE 213-215 can remove the old distribution rule.

Figure 5:
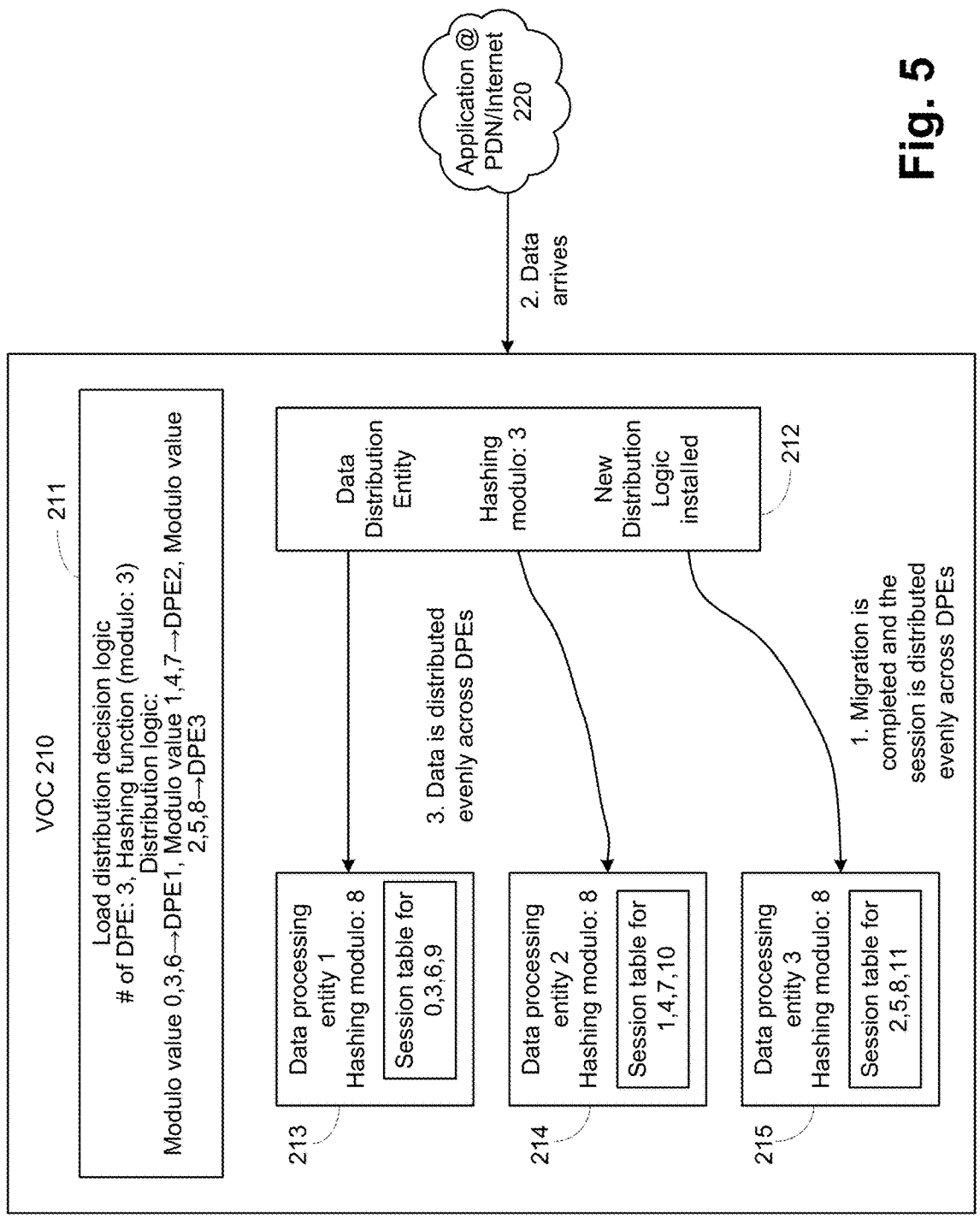
FIG. 5 is a diagram illustrating the system behavior when all the sessions are migrated based on a new distribution rule according to one embodiment of the invention.

FIG. 5 is a diagram illustrating the system behavior when the migration at the DPEs 213-215 is completed and all the sessions are stored at the DPEs 213-215 according to the new distribution rule. At step 1, since the migration is completed, the session is now evenly distributed across all the active DPEs 213-215 and no more session information migration is happening between DPEs 213-215. At step 2, when packets arrive, the data distribution entity 212 uses the new distribution rule and data is distributed evenly to all the active DPEs 213-215 according to the rule at step 3.

Therefore by immediately providing new distribution rules to the DPEs and delaying the new rules to the data distribution entity, sessions can be allowed to migrate between the DPEs sufficiently to minimize overall packet forwarding when the new rules are provided to the data distribution entity.

The migration of the sessions was described as being done while the session is in idle mode. While the delayed provision of the new distribution rules is one embodiment, the migration of the sessions during idle is useful even in the case where new distribution rules are provided simultaneously to all parties. As noted above, the idle mode transfer is preferred to minimize the need to transfer the session parameters during live packet transfers.

It is understood that the load distribution decision logic, the data distribution entity and the data processing entities can take various forms. In various embodiments the data processing entities are virtual machines (VMs) executing on standard servers, the functions being performed by software executing on the processors of the servers. In other embodiments the data processing entities can be a combination of dedicated hardware and VMs. Similarly the data distribution could be formed as VMs running the appropriate software but as readily be a combination of hardware routing portions and software portions to configure the hardware. In most embodiments the load distribution decision logic would be an application program executing in a VM but hardware assist could be done is desired.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system comprising:
    a plurality of data processing entities for processing data flows which require contextual information be maintained, each data processing entity including a memory for storing the contextual information of data flows being processed by the data processing entity, each data processing entity forwarding data flows not being currently processed by the data processing entity to the proper data processing entity processing that data flow, the data processing entity determining which data flows it is to be processing based on a distribution rule, each data processing entity providing information on the forwarding of data flows that is occurring;
    at least one data distribution entity coupled to the plurality of data processing entities for directing a data flow to a data processing entity based on a distribution rule; and
    a distribution decision entity coupled to the plurality of data processing entities and the at least one data distribution entity, the distribution decision entity developing distribution rules for use by the plurality of data processing entities and the at least one data distribution entity,
    wherein the distribution decision entity develops a new distribution rule when the number of data processing entities changes and distributes the new distribution rule to the plurality of data processing entities and the at least one data distribution entity, and
    wherein the new distribution rule is distributed to the plurality of data processing entities and the at least one data distribution entity simultaneously.

2. The system of claim 1, further comprising a data processing entity that transfers the contextual information of a data flow that was previously processed by the data processing entity to a different data processing entity after receiving the new distribution rule, and wherein if the data processing entity is designated for processing a data flow according to the new distribution rule but does not yet contain the contextual information for the data flow, the data processing entity forwards the data flow based on the previous distribution rule.

3. The system of claim 1, wherein the distribution rule is a modulo hash of a property of the data flow.

4. The system of claim 3, wherein the property is an Internet Protocol (IP) address.

5. The system of claim 2, wherein the transfer of the contextual information of the data flow that was previously processed by the data processing entity occurs when the data flow is in an idle mode.

6. A method comprising:
    processing a plurality of data flows by a plurality of data processing entities, each data flow requiring contextual information be maintained by a data processing entity;
    forwarding data flows not being currently processed by a data processing entity to the proper data processing entity processing that data flow based on a distribution rule;
    providing information on the forwarding of data flows that is occurring by each data processing entity;
    directing, by at least one data distribution entity, a data flow to a data processing entity based on a distribution rule;
    developing a new distribution rule when the number of data processing entities changes; and
    distributing the new distribution rule to the plurality of data processing entities and the at least one data distribution entity simultaneously.

7. The method of claim 6, further comprising:
    transferring, by a data processing entity, the contextual information of a data flow that was previously processed by the data processing entity to a different data processing entity after receiving the new distribution rule;
    wherein if the data processing entity is designated for processing a data flow according to the new distribution rule but does not yet contain the contextual information for the data flow, the data processing entity forwards the data flow based on the previous distribution rule.

8. The method of claim 6, wherein the distribution rule is a modulo hash of a property of the data flow.

9. The method of claim 8, wherein the property is an Internet Protocol (IP) address.

10. The method of claim 7, wherein the transfer of the contextual information of the data flow that was previously processed by the data processing entity occurs when the data flow is in an idle mode.

* * * * *